United States Patent
Schell et al.

[15] 3,674,889
[45] July 4, 1972

[54] PREPARATION OF OLEFINS VIA PT-SN CATALYST

[72] Inventors: Raymond A. Schell, Berkley; Lawrence J. Kehoe, Huntington Woods, both of Mich.

[73] Assignee: Ethyl Corporation, New York, N.Y.

[22] Filed: June 23, 1970

[21] Appl. No.: 49,161

Related U.S. Application Data

[63] Continuation-in-part of Ser. No. 776,788, Nov. 18, 1968, abandoned.

[52] U.S. Cl. ..........................260/681, 252/472, 260/614, 260/638, 260/668, 260/677
[51] Int. Cl. ........................................C07c 1/20, C07c 11/12
[58] Field of Search ...............................260/681; 252/472

[56] References Cited

UNITED STATES PATENTS

| | | | |
|---|---|---|---|
| 2,876,254 | 3/1959 | Jenner et al. | 252/472 |
| 2,398,103 | 4/1946 | Long | 260/681 |
| 2,561,483 | 7/1951 | Seon et al. | 260/681 |
| 2,986,585 | 5/1961 | Denton | 260/632 |
| 3,157,710 | 11/1964 | Hoyle et al. | 260/681 |
| 3,255,258 | 6/1966 | Charles et al. | 260/632 |
| 3,391,213 | 7/1968 | Fetterly | 260/681 |
| 3,574,773 | 4/1971 | Mueller et al. | 260/638 |

*Primary Examiner*—Delbert E. Gantz
*Assistant Examiner*—Veronica O'Keefe
*Attorney*—Donald L. Johnson

[57] ABSTRACT

A process for preparing unsaturated organic compounds by reacting an allylic alcohol and a ketone or aldehyde in the presence of carbon monoxide using a hydrohalo acid of a Group VIII metal/germanium or tin salt combination catalyst is described. The unsaturated organic compounds are principally hydrocarbon olefins having a molecular weight greater than the allylic alcohol reactant.

16 Claims, No Drawings

PREPARATION OF OLEFINS VIA PT-SN CATALYST

CROSS REFERENCE TO RELATED APPLICATION

This application is a continuation-in-part of Ser. No. 776,788, filed Nov. 18, 1968 now abandoned.

BACKGROUND OF THE INVENTION

The present invention is directed to a novel catalytic reaction of an allylic alcohol, carbon monoxide, a carbonyl compound, and a catalyst.

The reaction of olefins with carbon monoxide and an alkanol in the presence of a hydrohalo acid of a Group VIII metal/tin or germanium salt combination catalyst is known to produce carboxylic acid esters (see U.S. Pat. No. 2,876,254). This catalyst system is also known to isomerize double bonds of olefins; for example, hexene-1 is converted to hexene-2 and hexene-3.

It has been discovered that surprisingly an allylic alcohol and a ketone or aldehyde in the presence of carbon monoxide and a hydrohalo acid of a Group VIII metal/germanium or tin salt combination catalyst surprisingly and unexpectedly produces unsaturated organic compounds having a molecular weight substantially greater than the allylic alcohol; these unsaturated organic compounds are principally hydrocarbons.

SUMMARY OF THE INVENTION

A process for the preparation of hydrocarbon olefins having two or more carbon-to-carbon double bonds, from the reaction of an allylic alcohol, carbon monoxide, a suitable carbonyl compound, and a catalytic amount of a hydrohalo acid of a Group VIII metal/tin or germanium salt catalyst combination.

DESCRIPTION OF THE PREFERRED EMBODIMENTS

An embodiment of this invention is a process for preparing hydrocarbon olefins having two or more carbon-to-carbon double bonds from the reaction of an allylic alcohol having the formula

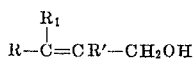

wherein R, R' and $R_1$ are independently selected from the group consisting of hydrogen and hydrocarbon alkyl, cycloalkyl, aryl, and aralkyl groups having from one to about 27 carbon atoms, a carbonyl compound selected from the group consisting of $C_3$–$C_{11}$ alkyl ketones, $C_1$–$C_{10}$ alkyl aldehydes, and mixtures thereof, carbon monoxide, and a catalytic amount of a catalyst combination of (a) a hydrohalo acid of a Group VIII noble metal and (b) a salt of a metal selected from tin and germanium. A preferred embodiment of this invention is a process in which R' in the allylic alcohol illustrated above is hydrogen, and in a more preferred embodiment R' and either R or $R_1$ are hydrogen. Alkyl ketones used in a preferred process are those having from three to about 11 carbon atoms. A catalyst combination featuring haloplatinum acids is especially preferred; combinations of haloplatinum acids and tin halides are especially preferred. The process of the present invention will be described in more detail below.

Allylic alcohols which are useful in the practice of the present invention are those having the following formula

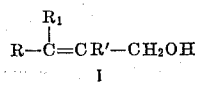

R, R' and $R_1$ in Formula I can be hydrogen and/or monovalent organic radicals. When any of R, R' and $R_1$ are monovalent organic radicals, these radicals should be such that they do not adversely affect the reaction in the present process. The hydrocarbon radicals which are represented by R, R' and $R_1$ include aryl groups as well as alkyl groups, having from one to about 27 carbon atoms, such that the total number of carbon atoms in the allylic alcohol does not exceed about 30. Examples of suitable organic radical substituents are aryl groups such as phenyl, alkylated phenyls, such as tert-butylphenyl, tolyl, xylyl, octadecyl phenyl, and the like; naphthyl, idenyl and the like; alkaryl groups such as benzyl, 6-phenyl-n-hexyl, 14-phenyl-n-tetradecyl, phenyl-n-eicosyl and the like; cycloalkyl groups such as cyclohexyl, methylcyclohexyl, cyclooctyl and the like; alkyl groups such as methyl, n-hexyl, heptacosyl, 2-ethyl-n-hexyl, isopropyl, pentyl, 2,2,4,4,6,6,8,8-octamethyl-nonyl, 2,4,6-trimethylheptyl, n-heptadecyl, n-tetradecyl and the like. Preferred organic radical substituents are the hydrocarbon alkyl radicals having from one to about 20 carbon atoms, phenyl, and $C_1$–$C_4$ alkyl substituted phenyl radicals. Examples of these preferred organic radicals are methyl, n-butyl, and the like, tolyl, n-butylphenyl, xylyl, and the like. In preferred allylic alcohols, R' is H; while in more preferred allylic alcohols R' and R or $R_1$ are hydrogen. The most preferred allylic alcohol is allyl alcohol.

The reaction is carried out in the presence of carbonyl compounds selected from ketones, aldehydes, and mixtures thereof. Preferred ketones are alkyl ketones having from three to about 11 carbon atoms. Examples of useful ketones are diisobutyl ketone, cyclohexane, methylethyl ketone, methyl isobutyl ketone, diamyl ketone, cyclohexyl ethyl ketone, undecanone-4, hexanone-2, nonanone-4, and the like. An especially preferred ketone is acetone. Preferred aldehydes are alkyl aldehydes having from one to about 10 carbon atoms. Examples of useful aldehydes are formaldehyde, acetaldehyde, n-propanal, cyclohexyl aldehyde, n-decanal, 2-methyl-n-butanal, n-heptanal, and the like. Mixtures of the aforesaid aldehydes and ketones can also be used. The amount of ketone, aldehyde, or mixtures thereof used in the present process may be varied. Generally, amounts of carbonyl compound ranging from about 10 to about 200 percent by weight of the allylic alcohol charged can be used.

Carbon monoxide is also required in the present reaction system. The carbon monoxide is ordinarily added as a gas and its concentration is generally designated in terms of pressure. Ordinarily CO pressures of from 15 to 10,000 psi are useful; CO pressures of 500 to 10,000 psi are conveniently used and preferred.

The catalyst used in the present process is a combination of (1) a hydrohalo acid of a Group VIII noble metal and (2) a salt of germanium or tin. The Group VIII noble metals include Rh, Ru, Os, Ir, Pt, and Pd. The hydrohalo acids of the Group VIII metals, wherein the halide has an atomic number of at least 17, are more preferred. Examples of useful salts of tin and germanium are stannous and stannic chlorides, bromides and iodides; germanium di- and tetrachlorides; germanium tetrabromides, germanium tetraiodides, stannous and stannic sulfates; the phosphates, borates and like compounds of tin and germanium. Examples of suitable hydrohalo acids of Group VIII noble metals are $H_2RuCl_6$, $H_2RuCl_5$, $HRuCl_4 \cdot 2H_2O$, $H_2RuBr_5$, $H_2PdCl_4$, $H_2PdCl_6$, $H_2OsCl_4$, $H_2OsI_4$, $H_3IrCl_6$, $H_2IrCl_6$, $H_3IrBr_6 \cdot 3H_2O$, chloroplatinous acid, bromopallidic acid, iodoplatinous acid, and the like. The hydrohalo acids of palladium and platinum are more preferred; and those of platinum are most preferred.

Especially useful catalyst combinations are salts of tin and hydrohalo acids of platinum or palladium. Some specifically preferred catalyst combinations are $SnCl_2$ and $H_2PtCl_6 \cdot 6H_2O$; $SnCl_2 \cdot 2H_2O$ and $H_2PtBr_6$; $H_2PdCl_6$ and $SnCl_2$; $H_2PdBr_4$ and $SnBr_4$; and $H_2PtI_4$ and $SnI_2$. A most preferred combination is $SnCl_2 \cdot 2H_2O$ and $H_2PtCl_6 \cdot 6H_2O$ or $H_2PtCl_4$.

Special preparation of the catalyst combination does not appear to be required. In general, the suitable metal salts hydrohalo acids are added directly into the reaction system. The ratio of the tin or germanium salt to the Group VIII noble metal hydrohalo acid can be varied. Amounts of tin or germanium salt sufficient to provide a tin (or germanium): Group VIII metal atomic ratio ranging from 1:1 up to about 10:1 can be used. The total amount of catalyst combination which can be employed in the process may be varied widely; in general a sufficient amount of the catalyst is provided to permit the reaction to proceed at a reasonable rate under the particular conditions, that is, temperature, pressure, etc., set for the process. Generally, an amount of the catalyst combination which provides about 0.0001 to about 0.2 moles of Group VIII noble metal per mole of allylic alcohol can be used.

The present reaction is ordinarily carried out at pressures above atmospheric; except where the other reaction ingredients, i.e., the carbonyl compound or the allylic alcohol, have any appreciable vapor pressure at the reaction temperature, the pressure of the system is ordinarily that attributed to the carbon monoxide. As pointed out above, the pressure may range from about 15 psi to about 10,000 psi.

Reaction temperatures may be varied; temperatures ranging up to 300° C. can be used. A reaction temperature range of from 70° to 300° C. is conveniently used.

The time of the reaction, of course, will be dependent upon other variables in the system such as the nature of the allylic alcohol, the CO pressure, the reaction temperature and the like. Generally, the reaction parameters, that is, the temperature and pressure, are adjusted so that a good yield is obtained in a reasonable time. Reaction times ranging from 30 minutes up to 24 hours or more can be used.

The product obtained in the present process is a mixture of various unsaturated compounds. These compounds include hydrocarbon olefins, unsaturated ethers and unsaturated alkanols. A principle component of the present reaction product is polyunsaturated olefin hydrocarbons, i.e., those having two or more non-aromatic carbon-to-carbon double bonds. Although the exact nature of the present reaction is not fully understood, it is believed the polyunsaturated olefins result from condensation of the allylic alcohol and the carbonyl compound. Thus, if a $C_{10}$ allylic alcohol and $C_4$ carbonyl compound were used as reactants, a principle component of the reaction product would be a mixture containing $C_{14}$ and $C_{28}$ and even higher carbon number polyunsaturated olefins. Reduction of the allylic alcohol to the corresponding hydrocarbon olefin also occurs in the present process; for example, allyl alcohol reactant will also yield propylene.

The olefin products of this invention have many utilities. They may be used either as mixtures or they can be separated by methods known in the art into their various compounds before use. These unsaturated compounds may be used as reactive monomers to prepare polymeric materials; they can be catalytically halogenated to form halogenated hydrocarbons which may be useful as solvents; they can be hydroformylated, that is, reacted with carbon monoxide and hydrogen in the presence of cobalt carbonyl to prepare higher molecular weight aldehydes and alcohols which are in turn useful as solvents, reaction intermediates, and the like.

Following are examples illustrating the process of this invention. All parts and percentages are by weight unless otherwise noted.

EXAMPLE I

An autoclave fitted with a magnetic stirrer was charged with 84.4 parts (1.45 moles) of allyl alcohol, about 60 parts of acetone, 5.8 parts (0.025 moles) of $SnCl_2 \cdot 2H_2O$ and 2.6 parts (0.005 moles) of $H_2PtCl_6 \cdot 6H_2O$. The autoclave was sealed, flushed twice with carbon monoxide and pressured to 2,000 psi with CO. The reaction mixture was stirred and the system was heated to 90° C.; the pressure at this temperature was adjusted to 3,000 psi with CO. The reaction was continued at this temperature for 12 hours and pressure dropped at the end of this time to 1,100 psi. The autoclave was then cooled and discharged; 106.5 parts of a black liquid product was obtained.

Conversion of allyl alcohol was based on a Gas Liquid Chromatographic (glc) analysis; the conversion was 100 percent. The liquid product was further analyzed via mass spectrographic analysis; it was found to contain about 60 percent of a mixture of $C_6H_{10}$, $C_{12}H_{22}$, and $C_{18}H_{34}$ polyunsaturated hydrocarbons, about 30 percent of $C_6$ unsaturated alcohol, and about 10 percent other unsaturated products.

The olefin conversion figure is the percentage of allyl alcohol which has reacted in the system.

Similar results are obtained if the $H_2PtCl_6 \cdot 6H_2O$ is replaced with equimolar quantities of $H_2PdBr_6$, $H_2OsI_4$, $H_3IrCl_6$, $H_2RhCl_4$, or $HRuCl_4$, or if the concentration of $H_2PtCl_6 \cdot 6H_2O$ is 0.008 moles or 0.0025 moles. Analogous products are obtained when formaldehyde, butylaldehyde, mixtures of diisoamyl ketone and n-hexanal, or nonanol is used in place of the acetone.

EXAMPLE II

The process of Example I was repeated except that no CO was added. Instead the autoclave was flushed with nitrogen gas and pressured to 40 psi. At the end of the reaction 148.1 parts of a brown liquid was obtained.

Conversion of allyl alcohol was 67 percent. The product analyzed by glc was allyl ether.

Example I clearly illustrates the process of the present invention wherein allyl alcohol is used as the allylic alcohol reactant. Example II illustrates the necessity of conducting the reaction in the presence of carbon monoxide. When carbon monoxide is used in the process (Example I), principally polyunsaturated hydrocarbons are obtained as the liquid product; when carbon monoxide is excluded from the system (Example II) the liquid product is the expected allyl ether.

Following is a tabulation of a series of examples further illustrating the process of the present invention. In each instance, the primary product obtained is a mixture of olefinic hydrocarbons having at least two carbon-to-carbon double bonds; and related molecular-weightwise to the allylic alcohol as the products in Example I are related to allyl alcohol.

| Example | Allylic alcohol[1] $R-C=CR-CH_2OH$ $R_1$ having— R and $R_1$ | $R_1$ | Carbonyl compound | Parts[2] | Catalyst | Moles | Catalyst | Moles | CO (p.s.i.) | Temp. (° C.) | Reaction time (hrs.) |
|---|---|---|---|---|---|---|---|---|---|---|---|
| 3 | H | $CH_3$ | Butanone-2 | 146 | $H_2PtCl_6 \cdot 6H_2O$ | 0.0001 | $SnCl_2$ | 0.001 | 500 | 75 | 0.5 |
| 4 | H | $C_{27}H_{55}$ | Cyclohexylaldehyde | 437 | $H_3IrCl_6$ | 0.1 | $SnCl_2 \cdot 2H_2O$ | 0.8 | 10,000 | 30 | 24 |
| 5 | H | Phenyl | Diisobutyl ketone | 236 | $H_2OsI_4$ | 0.05 | $GeCl_2$ | 0.35 | 5,500 | 105 | 11 |
| 6 | H | $C_{12}H_{25}$ | 2-ethyl-n-hexanal | 363 | $H_2PdCl_4$ | 0.025 | $GeCl_4$ | 0.075 | 2,000 | 170 | 6 |
| 7 | $CH_3$ | $CH_3$ | Formaldehyde | 70 | $H_2OsCl_4$ | 0.005 | $SnSO_4$ | 0.02 | 7,500 | 230 | 8 |
| 8 | $C_8H_{17}$ | $C_{10}H_{39}$ | Heptanone-3 | 262 | $H_2IrCl_6$ | 0.07 | $SnBr_2$ | 0.14 | 1,250 | 300 | 7 |
| 9 | Benzyl | H | Pinacolone | 224 | $H_2PtCl_4$ | 0.2 | $GeI_4$ | 0.2 | 8,300 | 110 | 1 |
| 10 | Naphthyl | $C_3H_7$ | 2-methyl-n-octanal | 251 | $H_2RuCl_5$ | 0.002 | $SnI_2$ | 0.018 | 3,500 | 250 | 3 |
| 11 | Cyclohexyl | $C_{14}H_{29}$ | Isbutylmethyl ketone | 507 | $H_3IrBr_6 \cdot 3H_2O$ | 0.0003 | $SnBr_4$ | 0.007 | 4,800 | 200 | 2 |
| 12 | Tolyl | Tolyl | 2,2-dimethyl-n-propanal | 313 | $H_2RhBr_5$ | 0.008 | $Ge(NO_3)_2$ | 0.04 | 2,300 | 135 | 4 |
| 13 | Isopropyl | Xylyl | n-Butanal | 156 | $H_2RhCl_6$ | 0.0006 | $SnCl_2 \cdot 2H_2O$ | 0.0036 | 6,200 | 280 | 18 |
| 14 | Dodecylphenyl | $C_2H_5$ | Undecanone-6 | 152 | $H_2PtI_6$ | 0.04 | $SnI_2$ | 0.22 | 5,000 | 160 | 20 |
| 15 | $C_5H_{11}$ | H | n-Decanal | 13 | $H_2PtBr_4$ | 0.03 | $GeBr_2$ | 0.225 | 1,000 | 150 | 14 |
| 16 | t-Butyl | t-Butyl | Cyclohexylmethyl ketone | 68 | $H_2PdCl_6$ | 0.006 | $SnCl_2 \cdot 2H_2O$ | 0.04 | 800 | 55 | 0.7 |
| 17 | 16-phenyl-n-hexadecyl | H | Pentanone-2 | 429 | $H_2RuBr_4$ | 0.05 | $Sn(NO_3)_2$ | 0.4 | 9,100 | 200 | 16 |
| 18 | H | H | Methy ethyl ketone | 65 | $H_2PtCl_4$ | 0.1 | $SnCl_2 \cdot 2H_2O$ | 0.4 | 15 | 270 | 10 |

[1] One mole of allylic alcohols is used in each example.
[2] By weight.

The process of the present invention and its embodiments have been described above. Claims to this invention are as follows:

We claim:

1. A process for preparing hydrocarbon olefins having two or more carbon-to-carbon double bonds which comprises the reaction of an allylic alcohol having the formula $$R-\underset{\underset{R_1}{|}}{C}=CR'-CH_2OH$$

wherein R, R' and $R_1$ are independently selected from the group consisting of hydrogen and hydrocarbon alkyl, cycloalkyl, aryl, and aralkyl groups having from one to about 27 carbon atoms, a carbonyl compound selected from the class consisting of $C_3$–$C_{11}$ alkyl ketones, $C_1$–$C_{10}$ alkyl aldehydes, and mixtures thereof in the presence of carbon monoxide, and a catalytic amount of a catalyst combination of (a) a hydrohalo acid of a Group VIII noble metal and (b) a salt of a metal selected from tin and germanium.

2. The process of claim 1 wherein said allylic alcohol is allyl alcohol.

3. The process of claim 1 wherein said carbonyl compound is ketone.

4. The process of claim 3 wherein said ketone is acetone.

5. The process of claim 1 wherein said Group VIII metal is platinum.

6. The process of claim 5 wherein said catalyst is a combination of a platinum hydrohalo acid and a tin halide.

7. The process of claim 1 wherein said Group VIII metal is palladium.

8. The process claim 7 wherein said catalyst is a combination of a palladium hydrohalo acid and a tin halide.

9. The process of claim 5 wherein said allylic alcohol is allyl alcohol, said carbonyl compound is acetone, and said catalyst is a combination of $H_2PtCl_6$ and $SnCl_2$.

10. The process of claim 1 wherein said carbonyl compound is said aldehyde.

11. The process of claim 10 wherein said Group VIII noble metal is platinum.

12. The process of claim 11 wherein said catalyst is a combination of a platinum hydrohalo acid and a tin halide.

13. The process of claim 10 wherein said Group VIII noble metal is palladium.

14. The process of claim 13 wherein said catalyst is a combination of palladium hydrohalo acid and a tin halide.

15. The process of claim 1 wherein said alcohol is allyl alcohol and said catalyst is a combination of hydrohaloplatinic acid and tin halide.

16. The process of claim 1 wherein said alcohol is allyl alcohol and said catalyst is a combination of hydrohalopalladic acid and tin halide.

* * * * *